Jan. 29, 1952     H. R. RICARDO     2,583,882
SUPERCHARGED INTERNAL-COMBUSTION ENGINE
Filed June 22, 1948     3 Sheets-Sheet 1
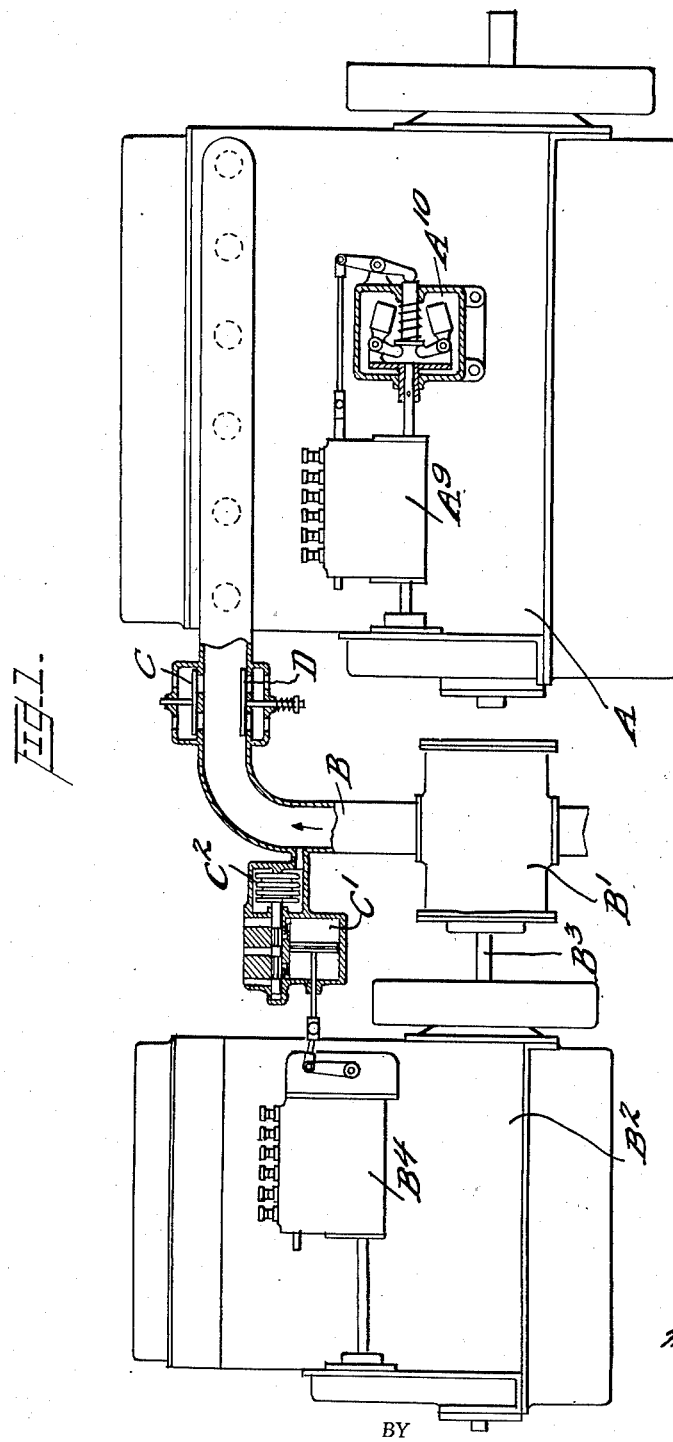
INVENTOR
Harry Ralph
Ricardo
BY
Watson, Cole, Grindle & Watson
ATTORNEYS

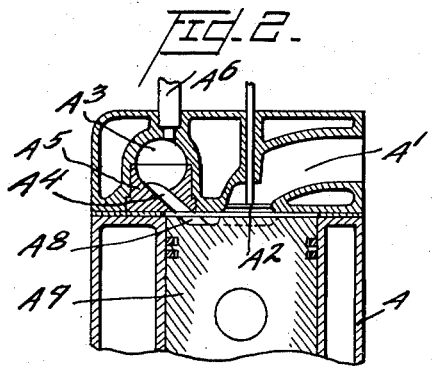
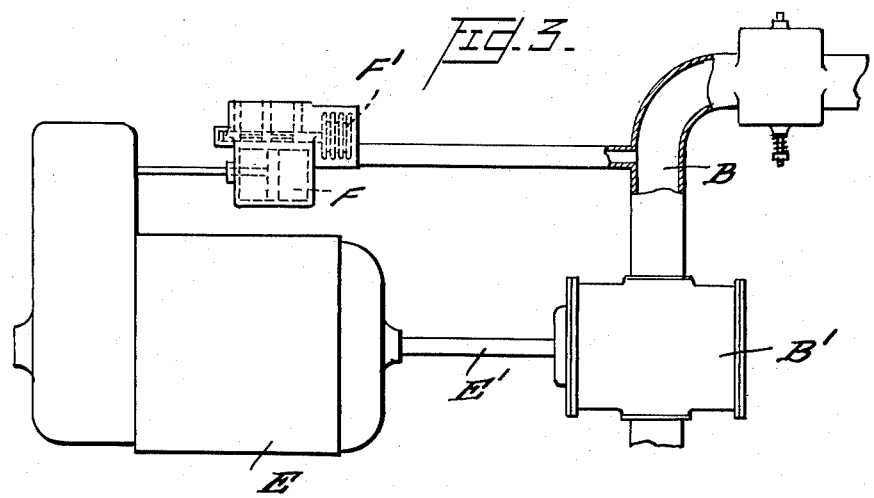

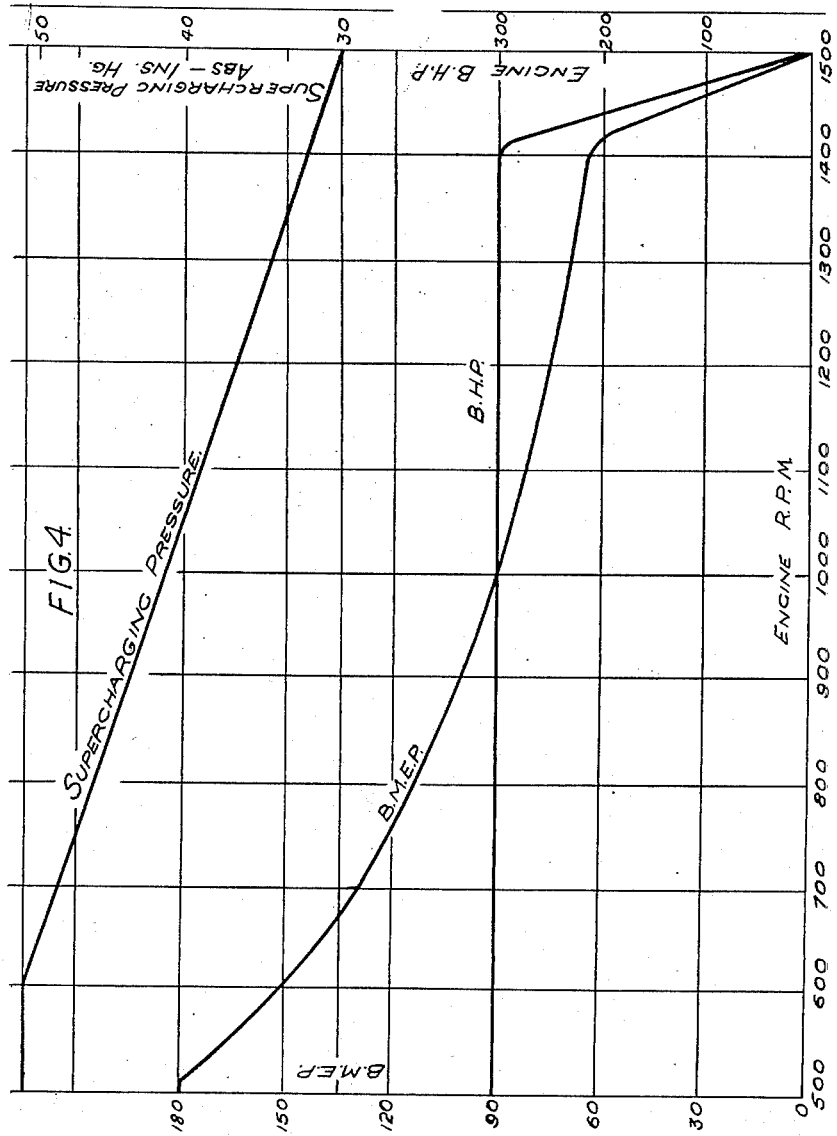

Patented Jan. 29, 1952

2,583,882

UNITED STATES PATENT OFFICE 2,583,882

SUPERCHARGED INTERNAL-COMBUSTION ENGINE

Harry Ralph Ricardo, London, England, assignor to Ricardo & Co. Engineers (1927) Limited, London, England, a company of Great Britain Application June 22, 1948, Serial No. 34,416
In Great Britain June 23, 1947

8 Claims. (Cl. 123—119)

This invention relates to power plants of the kind comprising a variable speed internal combustion engine of the liquid fuel injection compression ignition type and means for supplying it with compressed air for supercharging purposes. The kind of internal combustion engine of the liquid fuel injection compression ignition type employed in power plants according to the invention may vary but the invention has been found particularly satisfactory when employing an internal combustion engine of the kind in which substantially the whole or a large proportion of the combustion space at the end of the compression stroke is constituted by a chamber outside the cylinder and with which the cylinder communicates through a heat insulated member forming the lower portion of the chamber by a passage tangential to the wall of the chamber, whose contour is that of a figure of revolution. Examples of engines of this type are described in the specifications of the present applicator's British Patents Nos. 371,025, 431,341 and 439,426.

The main object of the invention is to provide a power plant capable of producing satisfactorily a high torque at the lower end of the engine speed range while yet being capable of running satisfactorily on fuels of low ignition quality and being both simple and reliable in operation.

A power plant according to the present invention comprises a main variable speed internal combustion engine of the liquid fuel injection compression ignition type, an air compressor or blower arranged to be driven independently of the engine at all times and to supply supercharging air through an air delivery duct to the engine and having a maximum capacity in relation to the capacity and speed range of the engine such that it can maintain a predetermined maximum supercharging pressure of not less than 1½ atmospheres absolute only up to engine speeds of not more than approximately half the maximum engine speed, and means for maintaining the supercharging pressure substantially constant at the predetermined maximum irrespective of the load on the engine at all times when the engine speed is within the range over which such maximum supercharging pressure can be maintained by the blower.

It is to be understood that the term "capacity" is used herein with reference to the blower to refer to the quantity of air which the blower can deliver in a unit of time at its maximum speed while the term "capacity" is used herein with reference to the engine to refer to the volume of air the engine will draw in per revolution.

The means for maintaining the supercharging pressure substantially constant at the predetermined maximum over the appropriate speed range of the engine may vary but in one arrangement includes a relief valve situated in the air delivery duct between the blower and the engine arranged to open automatically at the predetermined maximum pressure so as to permit escape of surplus air if this pressure tends to be exceeded. Alternatively or in addition the electric motor or auxiliary engine driving the blower may have associated with it mechanism responsive to the supercharging pressure in the air delivery duct between the blower and the engine for controlling the speed of such motor or auxiliary engine.

In any case there may be provided in the air delivery duct between the main engine and the blower an automatic air inlet valve adapted to open if and when the pressure in the air delivery duct falls appreciably below atmospheric pressure so that the main engine can then draw air direct from the atmosphere when it is operating at speeds at which its air consumption exceeds the maximum air delivery of the blower.

Further the main engine may incorporate a governor which so controls the injection of fuel in accordance with the engine speed and in relation to the supercharging pressure as to cause the engine to develop substantially the same power over substantially the whole of its working speed range except for a small range of speeds at the upper end of that speed range over which the power decreases rapidly with increases in engine speed.

The invention may be carried into practice in various ways but one form of power plant according to the invention is illustrated diagrammatically by way of example in the accompanying drawings, in which:

Figure 1 is a diagrammatic view of the complete power plant,

Figure 2 is a cross-section showing the general form of known cylinder head construction employed in the construction shown in Figure 1, Figure 3 is a diagrammatic view showing a modification of the power plant shown in Figure 1, and Figure 4 is a graph showing typical values for speed, power and supercharging pressure for a power plant according to the invention.

In the arrangement illustrated diagrammatically in Figures 1 and 2 the power plant comprises an internal combustion engine A of the liquid fuel injection compression ignition type and of the known form having a cylinder head and combustion chamber arrangement as indicated in Figure 2, that is to say of the kind in which the cylinder head in addition to having the normal inlet and exhaust ports, one of which is indicated at $A^1$, controlled by poppet valves as indicated at $A^2$, contains a combustion chamber $A^3$ into which a large proportion of the air charged is forced at the end of the compression stroke through a passage $A^4$ into a heat-insulated plug $A^5$, the combustion chamber being of circular cross-section in a vertical plane containing the longitudinal axis of the passage $A^4$, for example of spherical form, and fuel being injected by an injection device $A^6$ towards the surface of the plug $A^5$. In the arrangement shown the face of the piston $A^7$ has a recess therein as indicated at $A^8$ constituting a chamber external to the combustion chamber proper at the end of the compression stroke. Various forms of engine of the general kind shown in Figure 2 are described for example in the present applicant's British patent specifications Nos. 431,345, 457,491 and 439,426 and since the exact form of the engine in itself constitutes no part of the present invention it will not be further described.

The inlet ports of the internal combustion engine A communicate with an inlet manifold in known manner, which in turn communicates with an air delivery passage B to which supercharging air can be delivered under pressure from a centrifugal or other compressor or a blower $B^1$ driven by a separate auxiliary internal combustion engine $B^2$ through a shaft indicated at $B^3$.

The capacity of the supercharging unit comprising the blower $B^1$ and the auxiliary engine $B^2$ is such in relation to the capacity and speed range of the internal combustion engine A that the supercharging unit can maintain a predetermined maximum supercharging pressure in the air supply passage B of not less than 1½ atmospheres absolute only at engine speeds of less than half the maximum engine speed. Thus, in the example shown in the graph constituting Figure 4 of the drawings which indicates typical values of supercharging pressure, and power for a power unit according to the invention over the whole working speed range of the engine, the capacity of the supercharging unit is such that it can maintain the predetermined maximum supercharging pressure of about 51 inches of mercury up to an engine speed of only 600 R. P. M., the working speed range of the engine A being from 500 R. P. M. to 1500 R. P. M.

The air supply passage B is provided with an automatic spring-pressed relief valve C set to open automatically if the pressure in the passage B tends to exceed the predetermined maximum supercharging pressure, thus automatically preventing supercharging pressures in excess of the predetermined maximum. In addition, in order to reduce or eliminate waste of power by the auxiliary engine $B^2$ when the power unit is operating over the engine speed range at which the supercharging pressure is at the predetermined maximum, the fuel injection pump $B^4$ of the auxiliary engine $B^2$ is controlled by a servomotor $C^1$ the valve of which is actuated by a pressure-responsive capsule $C^2$ responsive to the pressure in the passage B so as to maintain the speed of the auxiliary engine $B^2$ only just sufficient to maintain the predetermined maximum supercharging pressure, during such low main engine speeds as permit of the predetermined maximum supercharging pressure being maintained.

An automatic air inlet valve D is also provided in the passage B to permit the engine A to draw additional air direct from the atmosphere when it is operating over the higher part of its total speed range when its demand for air may be such that the pressure in the passage B tends to drop below atmospheric pressure.

The fuel injection pump $A^9$ of the main engine A is controlled by a governor $A^{10}$ in accordance with a predetermined torque/speed curve, for example, as indicated in Figure 4, so as to provide substantially constant power output over the whole speed range of the engine except for the highest part of the speed range over which a rapid drop of power occurs with comparatively small increases in speed. It will be understood that means, for example of known type, will be provided by which the governor $A^2$ can be manually controlled for the purpose of bringing about required changes in the power output of the engine within the limits fixed by the characteristics of that governor as indicated for example in the graph constituting Figure 4 of the drawings.

In the modification illustrated in Figure 3 the general arrangement of the main engine and the passage B and valves C and D may be the same as has been described above with reference to Figures 1 and 2. In the construction shown in Figure 3, however, the air compressor or blower $B^1$ is driven by an electric motor E through a shaft indicated at $E^1$ and the speed of this motor is controlled by a servomotor device F the valve of which is actuated by a capsule $F^1$ subject to the pressure in the passage B. In this modification the control of the speed of the motor E would be effected in the same general manner as is the control of the auxiliary engine speed in Figure 1 while moreover the capacity of the supercharging unit comprising the blower $B^1$ and the motor E would be such that the predetermined maximum supercharging pressure of not less than 1½ atmospheres absolute can only be maintained up to a main engine speed of not more than ½ maximum engine speed.

Although in the example of values given in Figure 4 the predetermined maximum boost pressure is only maintained over a short section at the lower end of the engine speed range, namely from 500 to 600 R. P. M., and the control of the fuel pump of the main engine is such as to maintain substantially constant power output over the whole engine speed range except for a small section at the high end of that range, it is to be understood that the capacity of the supercharging unit may be such as to provide the predetermined maximum supercharging pressure up to any desired point less than approximately half the maximum main engine speed and that the relationship between main engine speed and fuel injection, as controlled by the governor $A^2$ in Figure 1, may be such as to produce any desired power/speed curve permitted by the boost pressure and mechanical considerations.

What I claim as my invention and desire to secure by Letters Patent is:

1. A power plant including in combination a main internal combustion engine of the liquid fuel injection compression ignition type, a supercharging unit for the internal combustion engine comprising an air compressor or blower and means independent of the internal combustion engine for driving the air compressor, an air duct by which the supercharging air is delivered from the supercharging unit to the engine, the maximum capacity of the supercharging unit in relation to the capacity and speed range of the internal combustion engine being such that the supercharging unit can maintain a predetermined maximum supercharging pressure of not less than 1½ atmospheres absolute only up to engine speeds of not more than approximately half maximum engine speed, and means for maintaining the supercharging pressure at such constant predetermined maximum irrespective of the load on the engine at all times when the engine speed is within the range over which the supercharging unit can maintain such maximum supercharging pressure.

2. A power plant as claimed in claim 1 including an automatic relief valve in the air duct between the supercharging unit and the internal combustion engine which opens automatically if and when the pressure in such duct tends to exceed the predetermined maximum supercharging pressure.

3. A power plant as claimed in claim 2 including an auxiliary engine for driving the air compressor and mechanism responsive to the pressure in the air duct between the supercharging unit and the main engine controlling the speed of the auxiliary engine.

4. A power unit as claimed in claim 3, including an automatic air inlet valve in the air duct between the supercharging unit and the main engine, which opens automatically when the air pressure in such duct falls appreciably below atmospheric pressure.

5. A power unit as claimed in claim 1 in which an automatic air inlet valve is provided in the air duct between the supercharging unit and the engine adapted to open when the pressure in such duct drops appreciably below atmospheric pressure.

6. A power plant as claimed in claim 5 including an automatic relief valve in the air duct between the supercharging unit and the engine which opens automatically when the pressure in such duct tends to exceed the predetermined maximum supercharging pressure.

7. A power plant as claimed in claim 6 including a governor on the engine controlling the fuel injection pump thereof in accordance with the speed of the engine and in relation to the supercharging pressure to cause the engine to develop a substantially constant brake horse power over substantially the whole of its working speed range except for a small range of speeds at the upper end of that speed range over which the power drops rapidly for increases in engine speed.

8. A power plant as claimed in claim 1 including a governor on the engine controlling the fuel injection pump thereof in accordance with the speed of the engine and in relation to the supercharging pressure to cause the engine to develop a substantially constant brake horse power over substantially the whole of its working speed range except for a small range of speeds at the upper end of that speed range over which the power drops rapidly for increases in engine speed.

HARRY RALPH RICARDO.

REFERENCES CITED

The following references are of record in the file of this patent:

UNITED STATES PATENTS

| Number | Name | Date |
| --- | --- | --- |
| 1,138,077 | Buchi | May 4, 1915 |
| 1,645,178 | Hall-Brown | Oct. 11, 1927 |
| 1,816,787 | Moss | July 28, 1931 |
| 2,053,321 | Brown | Sept. 8, 1936 |
| 2,165,360 | Elliott | July 11, 1939 |
| 2,223,715 | Berger | Dec. 3, 1940 |
| 2,306,277 | Oswald | Dec. 22, 1942 |

FOREIGN PATENTS

| Number | Country | Date |
| --- | --- | --- |
| 184,378 | Switzerland | Aug. 1, 1936 |